Feb. 26, 1952  R. C. SCOTT  2,586,868
THICKNESS-MEASURING INSTRUMENT
Filed July 12, 1947  7 Sheets-Sheet 1

Fig. 1

Inventor:
Robert C. Scott
by Emery, Booth, Varney, Medrow Whittum
Attys

Feb. 26, 1952 R. C. SCOTT 2,586,868
THICKNESS-MEASURING INSTRUMENT
Filed July 12, 1947 7 Sheets-Sheet 2

Inventor:
Robert C. Scott,
Attys.

Feb. 26, 1952 R. C. SCOTT 2,586,868
THICKNESS-MEASURING INSTRUMENT
Filed July 12, 1947 7 Sheets-Sheet 3

Inventor
Robert C. Scott,
by Emery, Booth, Townsend, Miller & Widner
Attys

Feb. 26, 1952 — R. C. SCOTT — 2,586,868
THICKNESS-MEASURING INSTRUMENT
Filed July 12, 1947 — 7 Sheets-Sheet 4

Inventor:
Robert C. Scott,

Feb. 26, 1952 R. C. SCOTT 2,586,868
THICKNESS-MEASURING INSTRUMENT
Filed July 12, 1947 7 Sheets-Sheet 5

Inventor:
Robert C. Scott,

Feb. 26, 1952 R. C. SCOTT 2,586,868
THICKNESS-MEASURING INSTRUMENT
Filed July 12, 1947 7 Sheets-Sheet 7

Fig. 20.

Inventor:
Robert C. Scott.
by Emery, Booth, Townsend, Miller & Widner
Attys.

Patented Feb. 26, 1952

2,586,868

UNITED STATES PATENT OFFICE 2,586,868

THICKNESS-MEASURING INSTRUMENT

Robert C. Scott, Belmont, Mass.

Application July 12, 1947, Serial No. 760,561

7 Claims. (Cl. 175—183)

This invention relates to a device for measuring the thickness of metal plates or surfaces from one side and the object is to provide an accurate, easily operated device for this purpose which may be organized as a portable unit adaptable for use in the field, as in the routine testing of boiler drums and tubes, gas cylinders and tanks, pipe lines, ships' hulls and all types of containers, pressure vessels and jacketed walls and the like, by the use of which reliable information as to the thickness of the plates, surfaces, or shells may be rapidly obtained.

In the practical arts there are many occasions where it would be desirable to determine the thickness of a metal plate or surface, but, either because of its area or shape or because of the form of the structure of which it forms a part, effective access can be had only to one side thereof. Metallic containers, vessels, and pipes of the kind stated above should be regularly inspected and tested, and it would be a great advantage if such inspection could be made without impairing the integrity of the plates or surfaces in any way and while the structures are in service, to obtain reliable information as to the thickness of the unimpaired metal, regardless of the degree of internal corrosion, erosion, pitting, or scale formation, and regardless of the fluid or solid contents. Without attempting to be exhaustive, such inspection and testing is particularly desirable in the case of boiler drums, pressure vessels and the like since it is in the operation of such equipment that the hazard of explosion with its consequent loss of life and damage to property is most pronounced. It is to be noted that practically every State in the nation recognizes this hazard and accordingly has enacted laws governing the inspection and operation of such equipment. While various expedients are adopted to minimize their incidence, corrosion and erosion unavoidably occur and are the greatest contributing factor to the deterioration of such equipment. Knowledge of the deterioration which has taken place and its rate of increase is important for the efficient operation of the installation as well as for reasons of safety. Hitherto such inspection has been difficult as well as costly, since the equipment has had to be shut down and drained. The inspector may then get inside and attempt to determine by visual inspection and by the quality of sound given off when the metal is struck by a small hammer, the condition of the interior surfaces of the metal plates of which the equipment is composed. To effect a measurement of their existing thickness it has been customary to bore a hole, to measure the thickness at the edge of the hole or closely thereto, and then plug the hole by suitable means. If the equipment is of the jacketed type and the jacket shells or walls are close together, then resort to the boring of holes in both surfaces forming the jacket is the only alternative for determining the thickness of the surfaces. Again this operation requires shutting down the equipment and draining it. The same procedure of boring holes and plugging them is customarily employed in the inspection of ships' hulls, which are placed in dry-dock at regular intervals for the purpose of determining the deterioration of the plates as well as other structural defects. The mechanism provided by the present invention permits determinations of the actual thickness of the plate or shell of the structure at an indefinitely large number of points which may be quickly obtained and, in many cases, without taking the equipment out of service.

The operating principle of the mechanism is based on well-known laws of electrical conductivity. From these we deduce that, if an electric current (direct current) flows between two point electrodes placed normal to a metallic plate of finite dimensions, the potential gradient at any point in the plate will depend upon the relative distances between the electrodes and between the electrodes and the point, and furthermore that the potential difference between any two such points will depend upon the relative positions of the points and electrodes, that is upon the geometry of the quadrilateral formed by the points and electrodes of which they are the vertices, and not upon the actual dimensions of the sides of the quadrilateral formed by the points and electrodes. We further deduce that if instead of two point electrodes, four point electrodes are used, and if the electrodes are spaced to form a square with distance "S" on a side and a steady direct current is passed between two adjacent point electrodes the potential difference $V_s$ between the other two point electrodes will depend upon the value of the direct current, the conductivity of the metallic plate or surface, the spacing between electrodes, and the thickness of the plate. Then, if a second such measurement is made with the same value of steady direct current but with the side of the point electrode square equal to twice the former value, or 2S on a side, a smaller potential difference $V_{2s}$ will be obtained between the two potential point electrodes; however, the ratio $$R = \frac{V_s}{V_{2s}}$$

between the two values of potential will be a function of the plate thickness and will not depend upon nor be influenced by the conductivity of the plate or surface material. In other words, the ratio will be the same for plates of equal thickness, regardless of the electrical, magnetic, or physical properties of the plate or surface material. The higher the value of direct current used, the higher will be the individual potential values for the same material; and the higher the conductivity of the plate or surface material for the same value of current used, the lower will be the individual potential values obtained. In both cases the values of $V_s$ and $V_{2s}$ will be proportionate, so that the ratio will be the same. Practical considerations in the design and manufacture of the mechanism provided by the present invention have imposed a limitation on the value of direct current used to a maximum of approximately 15 amperes, with an average value of approximately 6 amperes. The corresponding potential values obtained are very small, not exceeding approximately 40 microvolts and usually less than 20 microvolts.

While the statements which have just been given are not particularly abstruse to the physicist or engineer, to refresh the memory it may be convenient to give a very elementary exposition of the principles involved. Reference to diagrams is desirable in connection with such exposition, so I will postpone it to the brief description of the accompanying drawings which in addition to such diagrams provide illustrations of a preferred physical form in which the invention may be embodied and by means of which, taken in connection with the following specification, the principles of the invention and the construction of such physical embodiment may be understood.

Before describing the details of the apparatus illustrated, I shall, as already stated, first give a very elementary exposition of the fundamental electrical principles involved.

Figure 2:
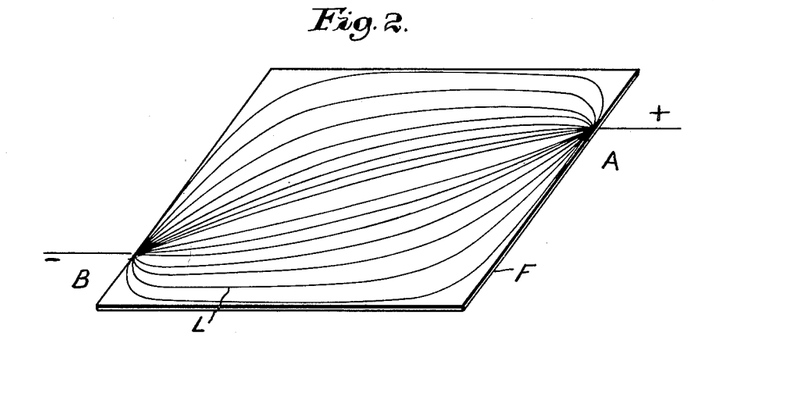
Figs. 2, 3, 4, and 5 are diagrams illustrative of certain elementary electrical facts.
Figure 3:
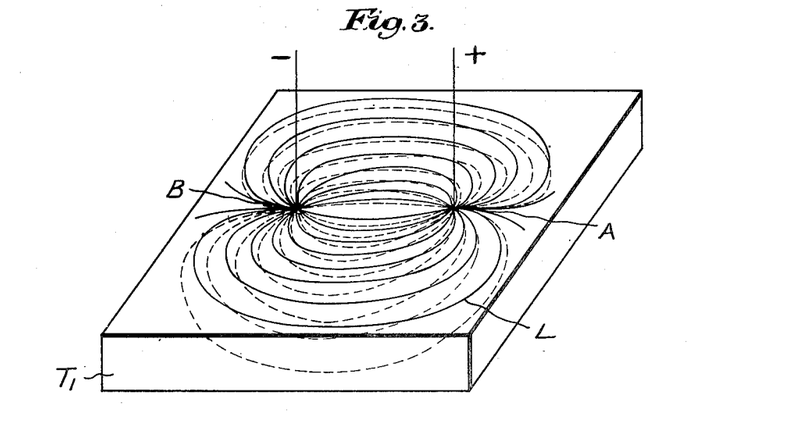
Figures 4, 5, 6, 7, 8:
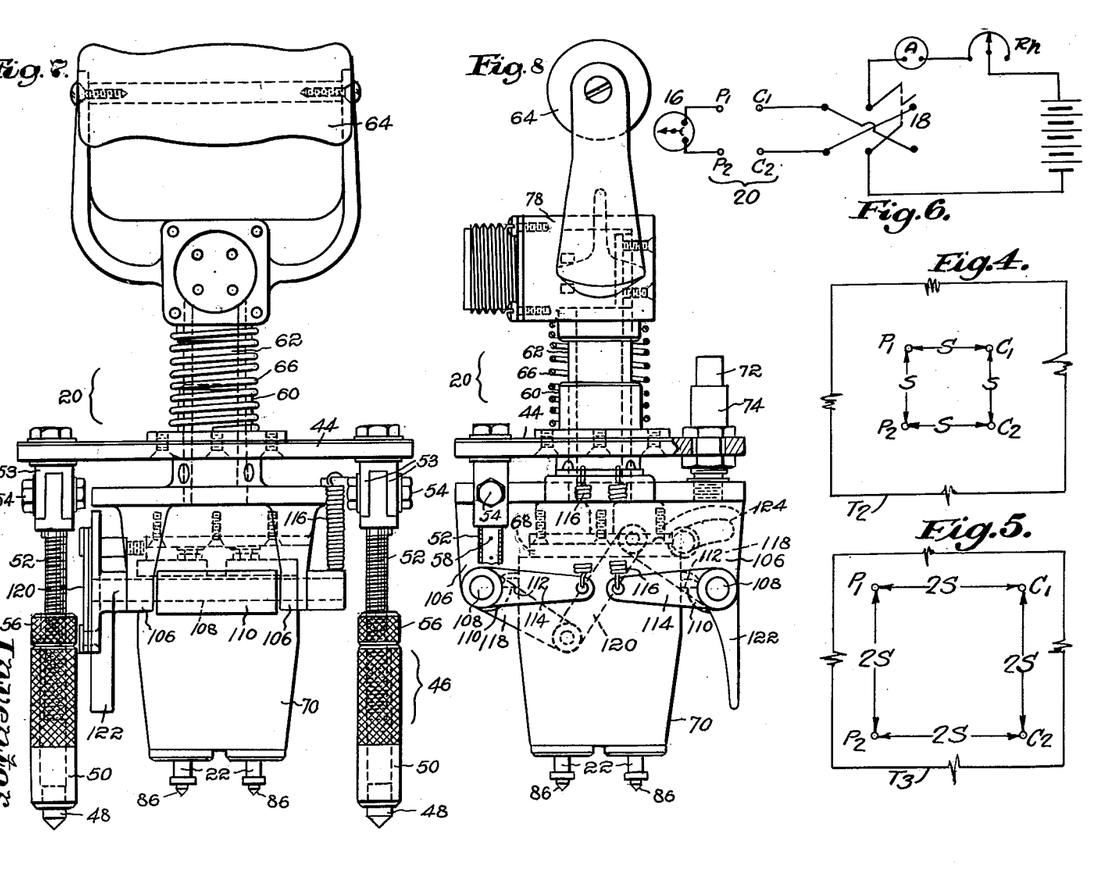
Fig. 6 is a simplified diagram illustration the fundamental electrical principle of the apparatus.
Fig. 7 is a front elevation of the mechanism, hereinafter termed the "probe," by means of which current is impressed on the plate through a pair of point electrodes and the resultant potential made available through a companion pair of point electrodes for measurement.
Fig. 8 is an end elevation of the probe with parts broken away and parts at the further side omitted.

Referring to Figure 2 it will be apparent to anyone with an elementary acquaintance with electrical engineering that if wires from the two poles of a battery are brought into contact with two points A and B at the edges of a flat and very thin sheet of metallic foil F, the current will flow through the foil not in one straight line from A to B, but in streamlines which start out in all directions from A and curl round to meet in B, and in curves very like those observed in the schoolboy experiment in which the magnetic lines of force from the north pole to the south pole of a magnet are demonstrated by scattering iron filings on a sheet of paper and placing the paper over the poles of a magnet. The lines graphically indicate conditions of current density, which is greatest in the straight line between points A and B. Now referring to Fig. 3, if the wires from the two poles of a battery are brought into contact with two points A and B on the surface of a plate $T_1$ of substantial thickness, the flow of current will be similar except that the current lines will be disposed in three dimensions throughout the body of the plate. Here again the lines graphically indicate conditions of current density which is greatest in the straight line between points A and B and, if the plate is large (semi-infinite), are of negligible value in the remote regions thereof. Referring now to Fig. 4, if we have applied to a plate $T_2$, positive and negative electrodes $C_1$ and $C_2$ spaced apart distance S and carrying a constant direct current between them, the current density at any point in the surface of the plate, or to be definite, at the point $P_1$ is a function of its distance from the positive and negative source at the two points $C_1$ and $C_2$. It is believed unnecessary here to particularize as to the functional relationship, because the skilled engineer will understand it and others would probably find the detail confusing. The potential gradient is proportional to the current density so that the difference in potential between two points $P_1$ and $P_2$ depends upon the relative distances between these two points and between these points and the current points $C_1$ and $C_2$. The four points referred to are preferably so taken as to form a square for convenience in computation as well as for mechanical convenience in the design and construction of the physical mechanism to be described. The potential difference between $P_1$ and $P_2$ can theoretically and in practice by means herein described, be measured. Now referring to Fig. 5 where the point electrodes $C_1$, $C_2$ and $P_1$, $P_2$ applied to the plate $T_3$ define the vertices of a square, the sides of which are twice as long as those of the square in Fig. 4; the dimensions being doubled and the conductivity of the material remaining the same, the potential value for the same value of steady direct current is proportionate. Hence, if the thickness of the plate is the same, and we assume uniform conductivity of the material throughout the area involved, then if we obtain values of potential difference between the points $P_1$ and $P_2$ for each spacing S and 2S and determine their ratio, the conductivity factor (or resistivity) will cancel out or vanish, and the ratio will give a relation between the sides of the four electrode squares and the thickness of the plate.

Figure 18:
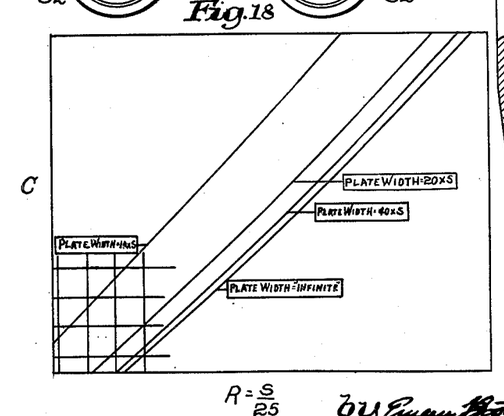
Fig. 18 is a view (not to scale) showing graphs by means of which the potential ratio determinations are translated into units of linear thickness.

By theoretical computations, which may be checked by experiment, we may determine a family of curves, similar to those shown in Fig. 18, wherein the abscissas represent ratios of potential differences obtained from spacings of the point electrodes in the ratio $$R=\frac{V_s}{V_{2s}}$$

and the ordinates represent the thickness in terms of S and may of course be designated, for any value of S, directly, in terms of thickness. For simplicity and convenience the ratio of the two electrode spacings is taken as that of one to two.

In the preceding discussion no account has been taken of the area of the plate relative to the side of the square formed by the point electrodes, or of the thickness of the plate relative to the side of the square which, as those skilled in the art will understand, are to be considered but which need not be explicitly discussed in the present specification. In practice, one dimension at least of the plate or surface being measured will be so large compared to the thickness of the plate or surface that it may be taken as "infinite." In Fig. 18 there is shown, without dimensional exactitude, a family of four curves for use respectively when the other dimension (width) of the plate is 10, 20, and 40 times, as well as a very large multiple of the smaller electrode spacing S, which set of curves will satisfy the conditions met in practice. Also in practice we have a general idea of the thicknesses of the plate or surface and desirably we choose S such that it is somewhat less than such thickness. If the sides of the electrode squares S and 2S are taken too small, the ratio R will be too large and conversely if the sides of the electrode squares S and 2S are taken too large the ratio R will be too small; in both cases the ratio will not fall within the range of the abscissas on the curves shown in Fig. 16, so that if the approximate thickness of the surface to be measured is not known, a trial measurement will readily indicate the values of the electrode spacings S and 2S that should be used.

When the determination is made by means of a ratio between measurements such as are diagrammed in Figs. 4 and 5 respectively, a further advantage of great practical value arises in that the actual reading in units given by the indicating mechanism is immaterial, provided the indicating mechanism is inherently accurate; thus if a voltmeter read so many microvolts and because of faulty calibration was ten per cent in error, this error would be the same for the readings corresponding to the Figs. 4 and 5 respectively, and the ratio would be correct, although the numerical values in microvolts might be wrong.

Let us suppose that we are measuring the thickness of a container, the interior walls of which is covered with rust, scale, or sludge or which is filled with some more-or-less conducting material. Nevertheless the electrical connection or bond between the solid "active" metal and these solid accretions or fluid content is negligible compared to the conductivity of the solid metal itself. The potentials involved are so small that the plane of contact functions as an effective wall of insulation and determinations may be made representative of the actual solid active metal wall thickness of the container. In the rolling of metal plates and sections, defects known as laminations sometimes occur where the plates or sections are not actually homogeneous but are composed throughout more or less of the area of two or more superposed plates or sheets. The break in continuity between the laminae may not be detectable by the naked eye, and may even be difficult to detect by the use of X rays; nevertheless, the break in continuity will act as an effective insulator between the outer lamination and the adjacent lamination and even though the sheets or laminae appear to be welded together, the measurement of thickness obtained by the physical mechanism to be described will be the thickness of the outer lamination, so that the variation from the normal expected thickness of the plate in question will indicate the presence of such a defect.

Fig. 6 diagrammatically shows an elementary diagram of an electrical circuit which is illustrative of the principle and operation of the physical mechanism provided by the present invention, wherein there appears at the left of the figure a battery for supplying direct current (amperes) to two adjacent point electrodes $C_1$ and $C_2$; $Rh$ is a rheostat and A an ammeter respectively for regulating and indicating the value of current; 18 is a double-throw double-pole switch for switching on and off and reversing the direction of the current through point electrodes $C_1$ and $C_2$; 20 is an arrangement of four point electrodes $C_1$, $C_2$ and $P_1$, $P_2$; and 16 is a sensitive output meter for indicating the very low values of potential (microvolts) across the point electrodes $P_1$ and $P_2$. To measure the thickness of a metallic plate or surface, the double-pole double-throw switch 18 is closed in one of the "on" positions, a value of current in amperes is adjusted to a suitable value and the corresponding value of potential in microvolts is determined from the output meter 16. Switch 18 is then thrown to the other "on" position thereby reversing the direction of current through point electrodes $C_1$ and $C_2$ (the valve of current being adjusted to the previous value), and a second reading in potential determined from the output meter. The output meter readings are averaged arithmetically to take account of any (unwanted) thermal potentials that may be in the potential measuring circuit. The procedure is followed for both electrode spacings S and 2S, from which the ratio $$R=\frac{V_s}{V_{2s}}$$

is determined, and from which the thickness of the plate or surface may be read directly from the curves or chart described heretofore with reference to Fig. 18.

The practical requirement is for a mechanism of high precision, yet rugged and portable since the field of use will primarily be in connection with fixed structures of considerable size. This includes the provision of means which may be rapidly and easily operated to apply in firm and steady conducting relation to the plate or surface and in accurate relative location, electrodes for the supply of current and electrodes for the measurement of potential, means whereby the spacing of the electrodes may be readily changed, and means whereby the currents and potentials involved, the potentials necessarily being of small absolute value, may be easily regulated and read with a high degree of accuracy.

In the light of this preliminary exposition my invention will be well understood by reference to the following detailed description of the particular physical mechanism illustrated which I shall now proceed to describe.

Figure 1:
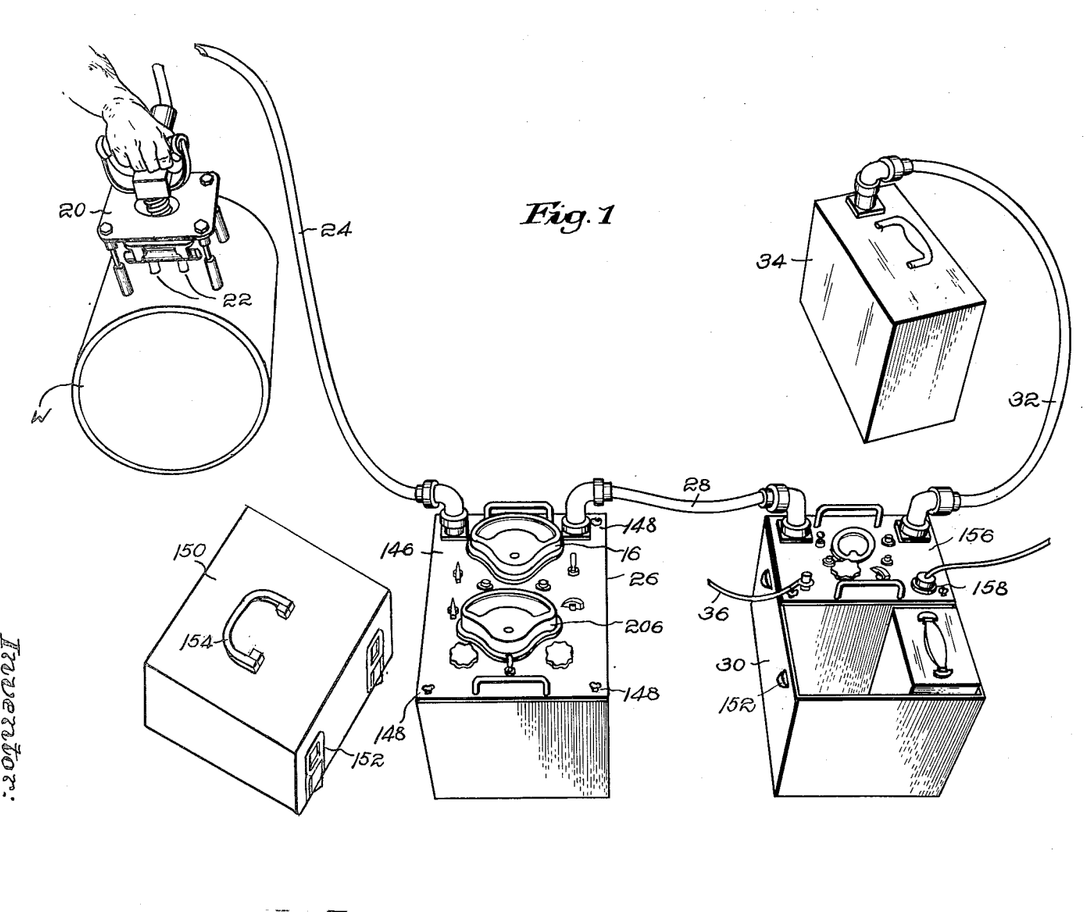
Fig. 1 is a partly diagrammatic perspective view showing the apparatus in use.

Figure 1 is a diagrammatic view showing the apparatus in use; the principal parts include what I shall term a "probe," designated generally by the numeral 20, which carries four quadrangularly arranged electrode points 22 though two of which current is applied to the plate or surface, the thickness of which is to be measured, such as the plate B shown in Fig. 1, and through the other two of which the potential to be measured is taken off for measurement. In use the positions of these points 22 correspond to the positions of points $C_1$, $C_2$ and $P_1$, $P_2$ in Figs. 4 and 5. The probe is grasped in the hand by a suitable handle and the construction is such that by a mere movement of approach a firm unwavering pressure of the points 22 in accurate relative position is provided for, without the possibility of movement occurring while the measurement is taking place which would disturb the electrical values involved. From the probe 20 a flexible cable 24 of suitable length carries electrical conductors herein to what I may term an "electronic voltmeter and control box" 26, the design and constructional purpose of which is to provide for the switching and controlling of the current into two adjacent electrode points 22, and to suitably amplify and indicate the small values of potential between the other two electrode points. From the electronic voltmeter and control box 26 a flexible cable 28 carries electrical conductors herein to what I may term a "power supply box" 30, the design and constructional purpose of which is to transform and regulate the various auxiliary voltages necessary for the operation of the amplifier forming part of the electronic voltmeter, as well as to provide suitable switching of the source of electric power for operating the electronic voltmeter, which may be either from 115 volts 50 or 60 cycle alternating current lines or, in the event such lines are not available, from a six-volt storage battery. The power supply box 30 also provides suitable switching of the direct current which is supplied to the probe electrodes 22 from a second six-volt storage battery and which may be 2 or 4 volts depending upon the kind and thickness of plate or surface being measured; and finally the power supply box desirably provides suitable rectifying means for charging both storage batteries with rectified (direct current) from 115 volt 50 or 60 cycle alternating current lines. From the power supply box 30 a flexible cable 32 of suitable length carries electrical conductors herein to what I may term a battery box 34 which contains both six-volt storage batteries described above.

A ground wire 36 is leading the power supply box 30 to a suitable ground connection such as a water pipe, to stabilize the electronic circuiting against changes in electrostatic capacity between the electronic circuiting and ground.

The instrument as a whole may be brought as a self-contained unit to test the plate or surface thickness of fixed installations, its use not being dependent upon the supply of electric power from any other source. The boxes are set down at any convenient location close thereto and connected together by the multiconductor cables. One operator will control the current to the probe, 20, make the desired readings of potential and determine the thickness of the surface measured. The other operator will clean the surfaces to be measured by removing paint, rust, or scale by means of a wire brush or file, and will grasp the probe and move, within the range of the cable 24, to the points where measurements are to be made. By virtue of the design of the probe as hereinafter described, he can apply it very easily, even in tight places, against plates or surfaces which either extend vertically or against more or less horizontal plates or surfaces either below his position or over his head.

I shall next describe the particuluar construction of the probe 20 and in doing so refer more particularly first to Figs. 7 and 8 and thereafter to Figs. 9, 10, 11, and 12 where certain parts are shown in greater detail and on a larger scale. The probe is organized on a suitable base 44 having four supporting legs 46, the lower ends being formed as sharp points 48 for making contact with the work. The points 48 are of hardened steel having coned points of 90° included angle and are fixed firmly in the lower ends of threaded sleeves 50 adjustable along eye bolts 52 which are adjustably pivoted between ears 53 at the corners of the base 44 by clamping bolts 54 which form parallel horizontal axes about which the legs at either end of the plate may be angularly adjusted in planes perpendicular to the paper viewing Fig. 7. Suitable lock nuts 56 provide for securing the sleeves 50 in adjusted position along the stems of the eye bolts 52. A portion of the bolt 52 may be flattened off (Fig. 8) and provided with a suitable scale of marks 58 to facilitate the adjustment of the four legs to the same length.

In the normal operation of the device the legs 46 are adjusted to a suitable length so that when they rest upon the work without any substantial pressure being exerted on the probe, the points 22 as illustrated in Fig. 6 will be spaced from the same. The arrangement shown whereby the legs may be adjusted to and clamped in a desired angular position other than the vertical position shown in Fig. 6 facilitates the operation in certain instances. For instance suppose the probe is to be applied to a pipe or other surface of relatively short curvature which the legs in the vertical position shown would span, they may be adjusted to an inwardly slanting position to provide proper clearance for the points 22 in the area between the lower ends 48 of the several legs.

Slidably mounted in a guide sleeve 60, arising from the base 44, is a plunger 62 in the form of a section of tube providing a conduit for electrical connections which will be referred to. The upper end of the tube is provided with a cross-handle 64 herein shown as of the general form of what is known as a D-handle familiar on shovels. The handle is normally maintained in an elevated position by a suitable spring 66 encircling sleeve 62. The electrode points 22 are carried at the lower end of the plunger.

Electrode points of differing spacing are essential for the majority of uses of the instruments and while the adjustment to different spacing of a single set of points is conceivable and possible, convenience, accuracy, and durability are promoted as in the present disclosure by providing several sets having fixed, predetermined spacings, a suitable construction being provided to promote easy interchangeability and secure mountings of these several heads without the possibility of setting up disturbing electrical effects. Herein (see particularly Fig. 8), the lower end of plunger carries a "socket" 68 into which "heads" 70 each carrying a set of determinately spaced electrodes are received. The socket 68 is positioned in oriented position relative to base 44 by means of a vertical post 72 projecting upwardly from one side thereof and sliding in a sleeve 74 secured to the base 44 (see Fig. 8). The plunger and socket are thus constrained to a rectilinear sliding movement without rotation.

In the bottom of the socket (see Figs. 8 and 9) is provided a quadrangularly arranged set of spring-pressed plunger contacts 76 from which electrical conductors lead, herein through the hollow center of plunger 62, to terminate (see Fig. 8) in one half 78 of a separable connector of known form opening laterally of the plunger below the cross-handle 64. Suitable means, such as a polarizing lug, commonly so termed, may be provided to insure proper matching up of the conductors in the cable 24 and the contacts 76. The socket receives the heads 70 which are desirably of the constructions hereinafter to be described in detail.

Figure 9:
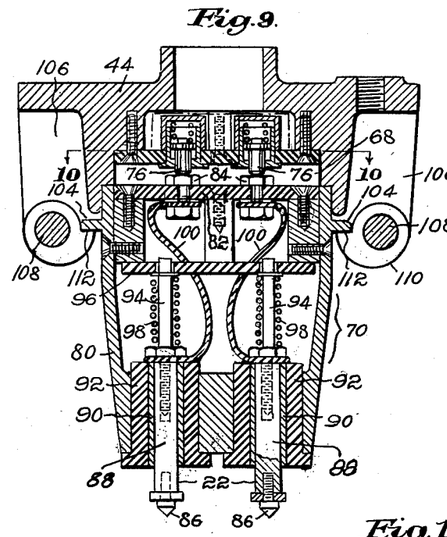
Fig. 9 is a section on a central vertical plane of a part of the probe shown in Fig. 7 and Fig. 8 but on a larger scale.
Figure 10:
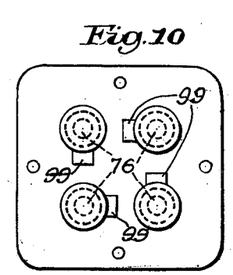
Fig. 10 is a plan view of one part as seen from line 10—10 of Fig. 9.
Figure 11:
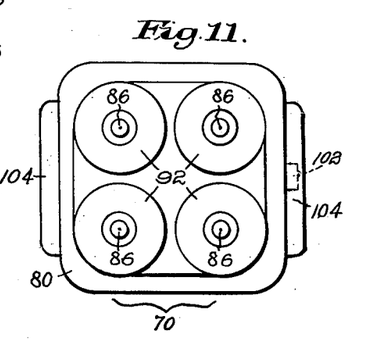
Fig. 11 is an end view of a portion of Fig. 9 looking up from below.
Figure 12:
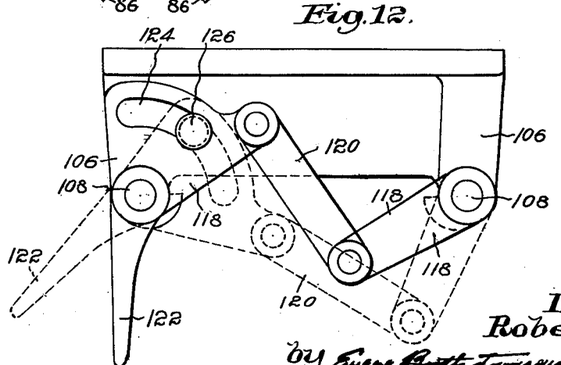
Fig. 12 is a fragmentary view as seen from the left of Fig. 7 or rear of Fig. 8 showing separated the mechanism for securing the head.
Figure 13:
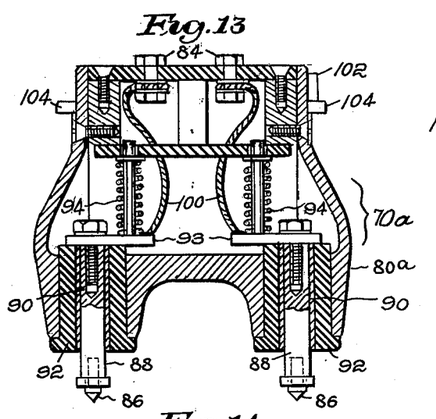
Fig. 13 is a view in vertical section showing a head having the electrodes more widely spaced than that shown in Figs. 6–10.
Figure 14:
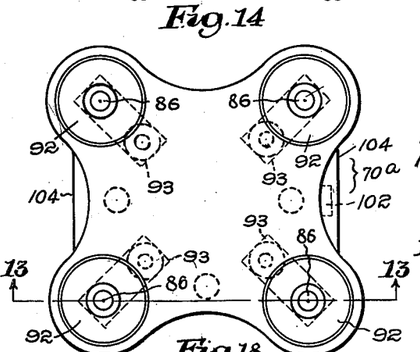
Fig. 14 is an end view of the head of Fig. 13 as seen from the bottom.
Figure 15:
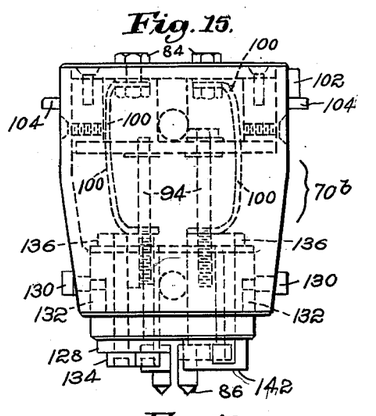
Fig. 15 is an elevation showing a head having electrodes more closely spaced than that in Figs. 7–11.
Figure 16:
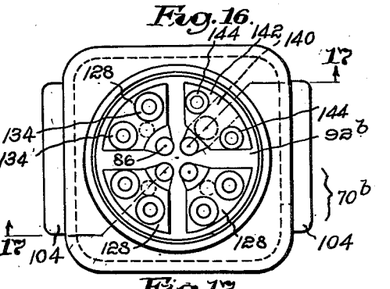
Fig. 16 is an end view of the head of Fig. 15 as seen from the bottom.
Figure 17:
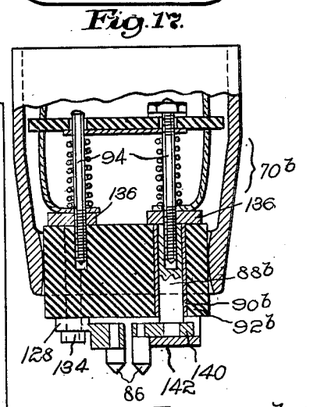
Fig. 17 is a section on line 18—18 of Fig. 16.

In connection with the commercial instrument on which the present drawings are based, the heads provided have spacings of ⅛", ¼", ½", 1", and 2", and as an example thereof I herein disclose the 1" head which appears in Figs. 7, 8, and 9; the 2" head shown in Figs. 13 and 14; and the ¼" head shown in Figs. 15, 16, and 17.

Referring to Fig. 9 more particularly, the head there shown comprises a shell 80, the upper end of which is adapted to enter the open end of the socket 68, the upper end being closed by a wall 82 of insulating material having at its near end contacts adapted when the head is entered into the socket and thrust axially thereof to make abutting engagement in the axial direction with the contacts 76 pressing back the latter against their springs. In referring to abutting engagement I here refer to an engagement so made that we may consider the contacts 76 to be on one side of a plane and the contacts 84 on the other. There is no wiping or rubbing action when the engagement is made. The contacts 84 are electrically connected to the electrode points 22 projecting at the lower end of the head. Herein (see the right of Fig. 9) these electrodes 22 comprise hardened steel points 86 having conical ends with a vertex angle of 90° and these points are firmly secured in the ends of rods 88 guided for reciprocating movement parallel to the vertical axis of the head in sleeves 90 extending through blocks 92 of insulating material mounted in the lower end of the shell 80. From the upper ends of the rods extend stems 94 guided at their upper ends in a cross-wall 96 of insulating material. Encircling these stems are helical springs 98 interposed between the cross-wall 96 and the upper ends of the rods 88. The springs thrust the rods and the points 86 carried thereby downwardly viewing Fig. 9. Each point independently may yield upwardly against its supporting spring, but is guided for rectilinear movement parallel to the vertical axis by the sleeve 90. Downward movement of the rods is limited by the soldering lugs 99 (Fig. 10) secured to the upper ends thereof. Heavy pigtails 100 connect lugs 99 at the upper ends of the rods 88 with the contacts 84 at the upper end of the head.

The heads 70 are entered into the socket 68 by a movement of axial approach. It is important that there be no wringing or rubbing movement which would be likely to set up disturbing thermal E. M. F. Herein the heads 70 are of such depth of vertical dimension that they may be encircled by the thumb and finger of the operator without his touching the contacts at either end thereof set into the socket 68 and latched in position by means insuring adequate electrical connection of the contacts 76 and 84. Herein the upper end of the head and the concavity of the socket which receives it is square as illustrated and a key or "polarizing lug" 102 is provided at one side to insure proper relative orientation. Alsong two sides of the upper ends of the shell 86 of the head are provided flanges 104 which serve as keepers or abutments for suitable rotary latches which I shall next describe referring particularly to Figs. 9, 12, and 8.

At either side of the socket 68 suitable depending brackets 106 support two parallel rock shafts 108 carrying centrally thereof (see Fig. 7) enlargements 110, each having a projecting latch face or shoulder 112. The cross-section of this enlargement with its projecting shoulder resembles a conventional cam having a single rise terminating in a sharp drop, but the surface which forms the drop from the high point is significant in the present instance and not the rise leading thereto. On one end of each shaft, the nearer side viewing Fig. 8 or at the right viewing Fig. 7, the shafts have arms 114 to which are attached springs 116 secured to fixed points of the socket 68. At the other ends of the shafts (see particularly Fig. 12) are operating crank arms 118 connected by a link 120 in the manner of anti-parallel cranks. One of these links is extended to provide an operating handle 122 and may have a segmental enlargement provided with a curved slot 124 concentric with its shaft 108 in which works a fixed guide pin 126 delimiting the movement of the handle and of the linkage. When the handle 122 is swung outwardly clockwise from the full line position of Fig. 12 the shoulders 112 of the enlargements 110 on the central portions of the shafts 108 point in a general downward direction and leave the socket unobstructed. A head may be inserted by the operator with one hand. The handle 122 is then pressed inwardly moving the parts to the full line position of Fig. 11. The two shoulders 112 then engage the undersides of the flanges 104 as shown in Fig. 8 and quietly but forcibly move the head home in the socket with resultant compression of supporting springs of the contacts 76.

In the use of the instrument the desired head is assembled in the socket. The legs 46 are now or have previously been so adjusted so that with the spring 66 unstressed the electrode points 22 are above the lower ends 48 of these legs as illustrated in Fig. 7. The operator grasps the handle 64 in a manner indicated in Fig. 1 and presses the sharp pointed ends 48 of the legs against the plate W. He may do this with equal facility laterally, downwardly, or upwardly. As he pushes on the handle, the spring 66 is compressed to place a load on the ends of the legs to prevent slipping of the probe on the work. Inward movement of the handle is limited by contact of the butt of the handle 64 with the sleeve 60. Pressure is manually maintained and clamps the base in position in spaced relation to the work substantially parallel thereto without danger of displacement or vibration. As the plunger continues its descent the socket 68 and the head 70 carried thereby descend and the electrodes 22 are rectilinearly advanced into contact with the work which they engage with substantially constant pressure due to their retreat against their supporting springs 98. The length of legs 46 is so adjusted that when the plunger has reached the limit of its movement the springs 98 are under compression adequate to hold them against the work so that the electrode points have a freely floating support. Manual pressure on the handle 64 advances the points 22 into contact with the work and stresses the springs 98 as described. Further pressure is transmitted directly through sleeve 60, base 44, and legs 46 to the work and variation of that pressure will have no effect on the pressure on the points themselves. The fool-proof accuracy obtained and the ease and rapidity of the operation will be apparent.

The upper part of the head which enters the socket 68 is of the same size for all heads whatever the size of the square formed by the electrodes. Since, by virtue of the flexible connections 100, the plunger rods 88 need not be directly opposite the contacts 84 a considerable variation in spacing of the former is possible without essential change of the form of the socket shell shown in Fig. 9 and a ½" head need vary only from the 1" head shown by the spacing of the rods 98 and their guiding sleeves 92.

In Figs. 13 and 14 I have shown a 2" head 70a wherein the upper end of the shell 80a is the same in dimensions and construction as in the case of the 1" head, but the lower part is extended radially outwardly in four directions to provide for the relatively wider spacing. The blocks of insulating material 82, the contact points 86, rods 88, and guide sleeves 90 are the same as before, but at the upper end of the rods are rigidly mounted inwardly extending arms 93 at the inner ends of which the spring-supporting stems 94 extend upwardly instead of being directly co-axial with the plunger rods as in the case of Fig. 1.

In Figs. 15, 16, and 17 I have shown a construction 70b suitable for the ⅛" and ¼" heads, the latter being illustrated. Herein as seen in Fig. 16, three of the electrode points 86 are mounted on the vertices of a set of sector-shaped elements 128. In the construction shown a single block 82b of insulating material is received in the end the socket and has a freedom of floating movement therein being retained by the ends of screws 130 working in vertical slots 132 in the sides of the block. Desirably also the portions of the shell opposing the sides of the block are somewhat rounded off as seen in Fig. 17 to permit a slight rocking movement of the block as a whole. Three of the contact points, those in the second, third, and fourth quadrants in Fig. 16, are rigidly mounted on the block 92b being secured to the lower face thereof by screws 134 extending through the block to anchor plates 136 at the near or upper face thereof. From these plates 136 arise the spring-supporting stems 94 as in the other cases and from them extend the pigtails 100 to the contacts 84. These three points because of their closely arranged spacing can set on the work just as do the legs of a three-legged stool. The fourth point, that in the first quadrant viewing Fig. 16, is made independently yielding in a manner similar to the construction disclosed in Fig. 9 to permit it to accommodate itself to the other three. This fourth point 86 is carried at the inner end of a radially extending arm 140 which is maintained in the radial position by yoke or strap 142 secured by screws 144 similar to screws 134 to inner plate 138 similar to plates 134. From the outer end of the arm 140 there extends upwardly a rod 88b guided in a sleeve 90b as in the case of the corresponding parts 88 and 90 in the 1" head shown in Fig. 8. Mounted at the upper end of the rod is the spring-supporting stem 94. The point 86 thus movably mounted is made somewhat shorter than the other points utilized in this head and is normally thrust forward into the same plane under the stress of its spring 94, but is free to yield upwardly as conditions of the work may require.

Referring now to Fig. 1, the box 26 which houses the electronic voltmeter and control box is conveniently made with a body of welded aluminum closed at the top by a panel 146 on which the manually operated controlling elements and the indicating elements of the electronic mechanism diagrammed in Fig. 20 and hereinafter to be described are exposed, a suitable chassis supporting these being suspended from the panel. The panel and chassis is removable from the body of the box as a unit. It may be set down therein and secured by means of thumb screws 148. A removable cover 150 may be secured to the top of the box by catches 152 and is provided with a handle 154 so that the box may be carried in the hand suspended in the manner of a traveling bag, its size and weight making this possible.

The so-called power supply box 30 has a similar body and a small panel 156 and also provides storage space for the probe 20, the several probe heads, and the various connecting cables when they are not in use. It is provided with a similar cover, not shown, and may be carried suspended in the hand in the manner of a traveling bag in the same way as the box 26.

The battery box 34 is conveniently of wood and provided with a handle so that it may be carried in the same manner. If the instrument were always to be used where a source of alternating 60-cycle current is available, the battery box might be dispensed with and the necessary battery 34a for supplying current to the points C housed in the box 30. As already described, one operator is handling the probe. The mechanisms which must be operated or read by the other operator are concentrated on the panel 146 of box 26. When the probe and the cables are stowed in the box 30 and the covers placed in position, the several boxes may be carried, for instance, in the trunk (baggage compartment) of an ordinary passenger automobile or in the back seat and may be brought by hand by the two operators to the exact place of use as simply as they might carry ordinary pieces of hand baggage.

Figure 20:
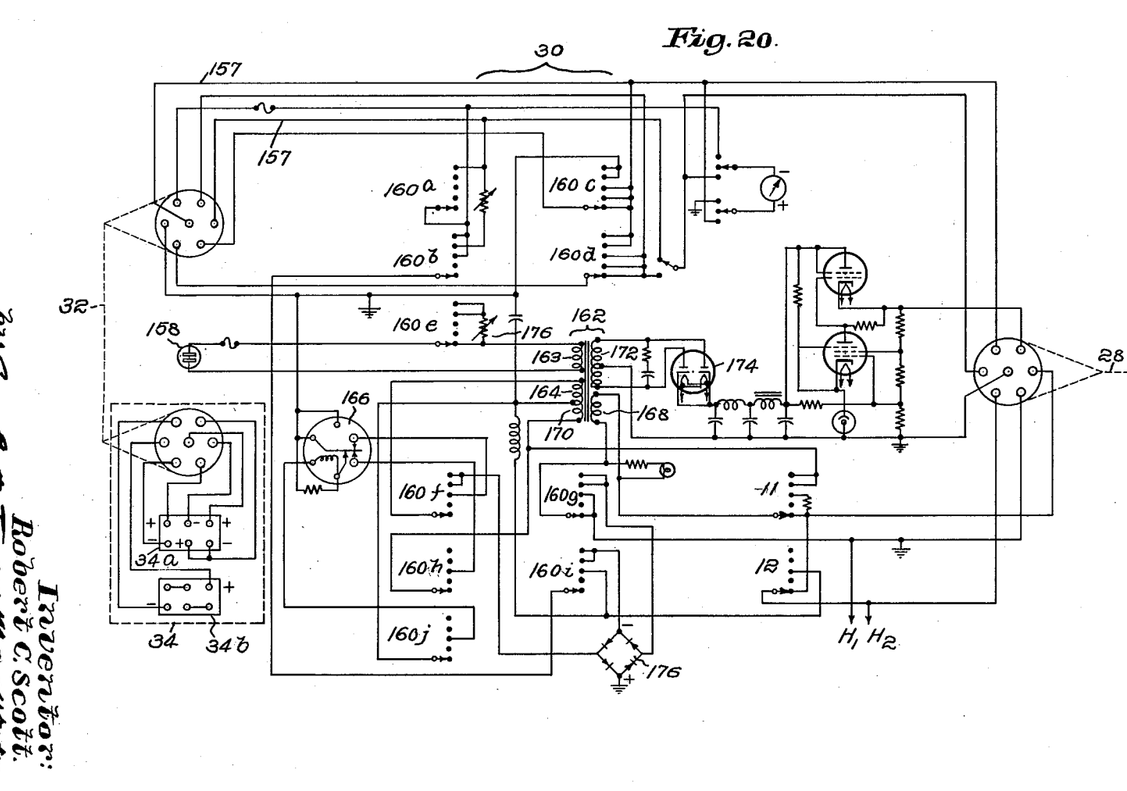
Fig. 20 is a wiring diagram showing particularly the arrangement of the mechanism for transforming and regulating available sources of electric current to provide for operation of the mechanism shown in Fig. 19, the devices diagrammed in Fig. 19 being in the physical example illustrated organized in the so-called power supply box.

I shall now describe the electric mechanisms which are carried by the power supply box 30 as diagrammed in Fig. 20. Direct current for the probe points $C_1$ and $C_2$ is supplied from battery 34a and through cable 32 to wires 157 and by connections not necessary to trace in detail through cable 28 to the box 26. The power mechanism may be energized either from battery 34b through cable 32 or from an A. C. line plugged in at 158. The circuits are controlled by a main gang operated control switch 160a to 160j inclusive which has five positions which control the source of power (A. C. or D. C.); switches the power on or off; switches the charging of the probe input battery 34a; and switches the charging of both probe input battery 34a and power supply battery 34b. This switch is here shown in the position it occupies when the instrument is being used with power derived from an exterior A. C. line plugged in at 158 rather than from battery 34b.

Figure 19:
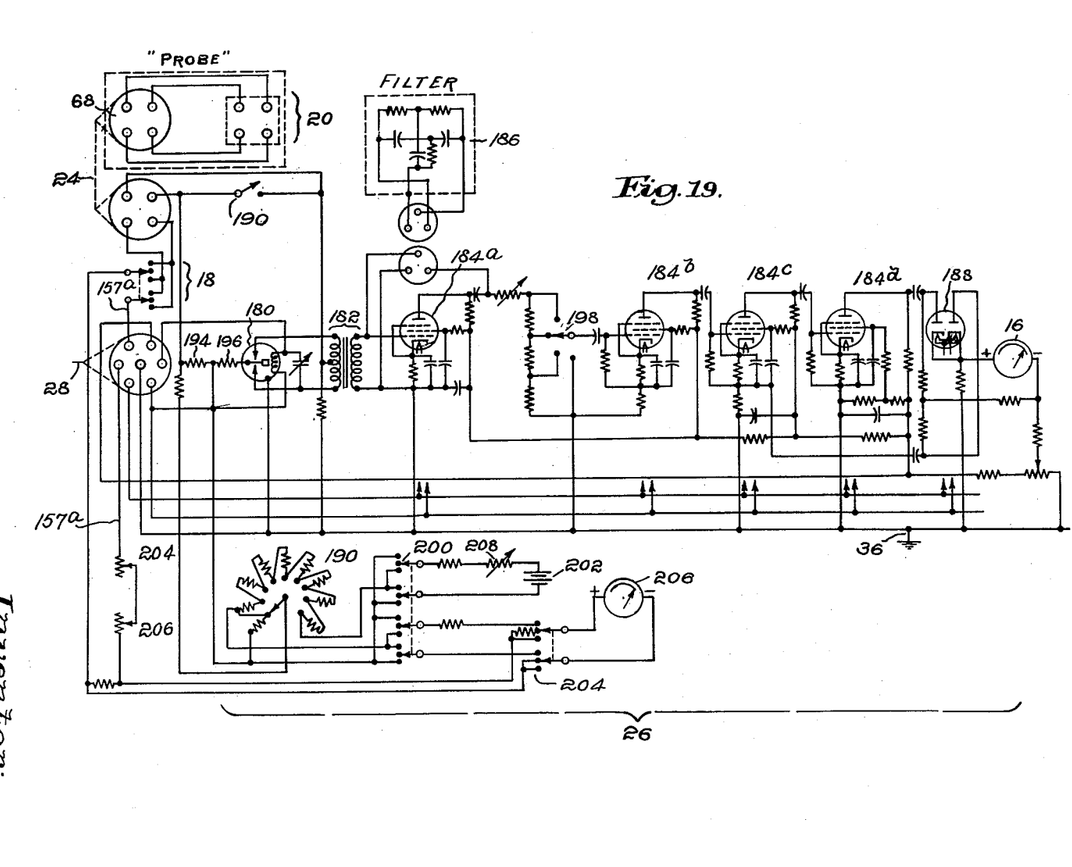
Fig. 19 is a wiring diagram showing particularly the arrangement of the mechanism for controlling and measuring the currents involved, which in the physical example illustrated are organized in the so-called electronic voltmeter and control box.

Power is taken through a transformer 162. If the source of power is 115 volt 50 or 60-cycle power lines to coil 163 of the transformer the circuiting is conventional in that the voltages produced as well as the necessary filtering and regulation is well understood by those skilled in the art. If the source of power is from the six-volt storage battery 34b, a special winding 164 on the transformer 162 is used as the primary or input winding and the direct current is converted to alternating current by means of a vibrating-reed power convertor 166; the filament voltages for all electronic tubes in both the power supply box 36 and the electronic voltmeter and control box 26 are supplied directly from the storage battery, and the vibrating-reed voltage convertor 180 in the electronic voltmeter amplifier, to be hereinafter described in connection with Fig. 19, is supplied with 60-cycle alternating current from power vibrator 166. If the main control switch 160 is in either of the "charge" positions, the windings 168 and 170 of transformer 162 are connected in series additive and the high-voltage winding 172 is made inoperative by virtue of the filament circuit of the rectifying tube 174 being opened. The A. C. charging current is rectified by means of a dry-type rectifier 176, and the value of charging current is adjusted by means of a resistor X which is switched into the primary winding of the transformer only during the charging cycle.

The electrical mechanisms housed in the electronic voltmeter and control box 26 will next be described in connection with diagram Fig. 19. Apart from the reversing switch 18 and rheostats 204—206 seen at the left of the figure and which provide for leading direct current from battery 34a (wires 157a at the left of Fig. 19 being essentially continuations of wires 157 at the left of Fig. 20) from cable 28 to cable 24 and thence to socket 68 on probe 20 the mechanism shown may be characterized as a high-gain amplifier with a suitable, more or less standard voltmeter, connected to its output. The electronic voltmeter is unique in that it is extremely stable, light in weight, rugged, and linear over a range of direct-current input values from three microvolts to the upper limit of its range, which in its present form is 40 microvolts, though the range may be extended if necessary. The amplifier provides an overall accuracy of within one-half of one per cent, at full-scale of the output meter.

The basic function of the electronic voltmeter is to convert low values of direct-current voltage input from the points $P_1$ and $P_2$ of probe 20, which are of the order of microvolts, to very much higher values of alternating-current voltages which are of the order of volts, then to rectify the alternating-current voltages back to direct-current voltages, and impress them on a precision type direct-current output meter. To accomplish this, the input circuit consists of a vibrating-reed type of converter 180, which converts the direct-current voltages impressed on it to alternating current voltages at a frequency of sixty cycles per second. The alternating current voltage is then fed to a suitable high-gain center-tapped transformer 182, the output or secondary winding of which is in turn fed to a high-gain stage of an alternating current type of amplifier comprising the stages 184a to 184d inclusive.

Now, the alternating current produced by a vibrating-reed type of converter is approximately square or trapezoidal in wave form, which means that it is composed of a very large number of sine waves of different frequencies. This type of wave form introduces amplification difficulties when linearity is of prime importance as in the present case; hence, to overcome this condition, a special filter 186 is used the function of which is to reject approximately all frequencies except the fundamental or sixty-cycle sine wave frequency. The filter 186 is connected across the first stage in such a manner that approximately all frequencies are "fed back," or rejected, except the fundamental sixty-cycle frequency which alone is fed to the following stages of the amplifier for further amplification, and which results in a very close approximation to a pure sine wave alternating current output before final rectification to direct current. The special filter may be designed as essentially a short circuit to everything except a sixty-cycle fundamental sine wave frequency; however, this would cause the amplifier to be frequency sensitive, which in turn would impose practical limitations on the use of the amplifier. To avoid this, two plug-in type filters are provided, one for use on fifty-cycle and the second for use on sixty-cycle power lines; furthermore, each filter has an acceptance frequency range of approximately two cycles per second above and below the center frequencies of 50 and 60 cycles respectively.

From the first stage 184a of the amplifier, the signal passes through a calibrated attenuating network which determines the sensitivity of the amplifier and which it is customary to refer to as the "gain" of the amplifier, followed by a second high-gain stage 184b which has a high percentage of feed-back around it, in order to provide for maximum stability. The signal then passes through two additional high-gain stages 184c and 184d, following which it passes through a full-wave diode rectifier 188. The ground side of the rectifier circuit input is fed back into the second preceding stage in such a way that any rectification errors in the circuit are balanced out. In addition, the circuit impedances are so chosen that errors due to the impedance of the rectifying diode are negligible compared to the impedance of the circuit. The diode rectifier 188 is of the full-wave type to eliminate errors due to possible unsymmetry of the alternating current output of the amplifier and which may be introduced by the vibrating-reed convertor 180 which converts the direct-current input to alternating-current. The output from the diode rectifier is then passed through a direct current microammeter 16, the readings of which are a function of the voltage across the diode circuit. Furthermore, due to the "contact potential" of the diode, a direct current "bucking voltage" is placed in the circuit which enables the output voltage to be made linear from approximately two microvolts to the upper limit of the input range; this bucking voltage also serves to correct any non-linearity from the input circuit.

A calibrating network 190 is included in the electronic voltmeter and control box 26, the purpose of which is to impress across its input, known values of voltage from which the electronic voltmeter may be calibrated for three different values of sensitivity, 10, 20, and 40 microvolts full-scale output of the output meter 16 respectively, and also for checking and adjusting linearity. To calibrate the electronic voltmeter for either the 10, 20, or 40 microvolts full-scale output, the switch 192 is closed which short circuits the input through the precision resistors 194 and 196. The gain control switch 198 is then set at one of its three positions, the gang-operated four-pole double-throw switch 200 is closed in one of the "on" positions for furnishing potential to the network from the small three-volt dry-cell battery 202, and the double-pole double-throw switch 204, which switches meter 206 for operation either as a direct-current ammeter for 10 amperes or 20 amperes full scale or as a direct-current voltmeter for 2 volts full scale, is closed for operation of 206 as a voltmeter. Rheostat 208 is adjusted to give 2 volts as indicated on meter 206, and by means of the network switch, values of microvolts from 1 to 20 in suitable steps may be impressed across the input resistor 194 and the values of the output meter 16 determined. Switch 200 is then closed for the other "on" position which reverses the direction of the potential across precision resistor 194, and the value of the output meter 16 determined for the same value of input voltage. The two output meter values are arithmetically averaged to take account of any (unwanted) thermal potentials in the input circuit.

The network 190 may also be used for "bucking out" thermal potentials in the input circuit when the probe is in use. The presence of thermal potentials will always be evidenced by a difference in output voltage values for the same value of input voltage, when the direction of the input voltage is reversed. The difference between the output voltage values may be reduced to zero if necessary by means of the network. It will be apparent that in no event will the accuracy of the output readings be impaired, provided an arithmetical average is taken of two readings for the same value of input voltage but with the direction of the input different for each reading.

The value of current (amperes) used across the probe electrodes in determining the thickness of plates or surfaces is adjusted by means of rheostats 204 and 206 shown at the lower left of Fig. 19 where 204 provides coarse adjustment in "steps," and 208 linear adjustment between steps, so that a value of current may be obtained and readily reproduced for spacings of probes S and 2S with a high degree of accuracy, which is essential for the accuracy of the mechanism as a thickness gauge. Double-pole double-throw switch 18 connects the probe 20 in or out of circuit and also reverses the direction of current through the current electrodes of the probe.

The precision resister 196 is of the order of 100 ohms and is connected in series with the input circuit to take account of any difference of contact resistance between the electrode points and the plates or surfaces being measured, and also the difference in resistance in probe cable lengths that may be used. Since in no event would such difference in resistance be more than approximately one ohm, it is apparent that the maximum error that could be introduced by such means would not exceed one per cent.

The apparatus described is of such sensitivity as to be sensibly affected by unwanted thermal potentials in the input circuit. Therefore in contrast to what might be considered normal practice in actually wiring up the circuits as shown in the diagrams all connections between input transformer and voltage converter are made of high conductivity. I have found that No. 10 A. W. G. solid copper wire is satisfactory. All connections are made with a special high lead content solder. These arrangements equalize any thermal unbalance in the circuit due to any cause whatever, but which if present would be caused principally by sudden changes of ambient temperature.

The several cables 24, 23, and 22 are provided with suitable detachable connectors of the "polarized" type, that is they are so arranged that they may be joined in one position of relative angular presentation so that the various connections are properly made.

I claim:

1. A mechanism for measuring the thickness of plates wherein a direct current is applied through a pair of spaced points on the plate and the resultant potential between a second pair of points not colinear with the first pair and in definite spacial relation thereto is observed comprising a probe having a handle by which it may be grasped and wielded, pairs of individually spring-pressed electrodes definitely spaced in portions corresponding to the vertices of a quadrilateral carried thereby to be resiliently engaged with the plate when the probe is pushed against the same by means of the handle, conductors from said electrodes arranged as a flexible cable extending from the probe and a container portable in the manner of a handbag in which are assembled devices for controlling current from a source of direct current to apply through two of the conductors a current of predetermined amperage to a pair of the electrodes, a converter in circuit with the other pair of electrodes, an electronic amplifier for proportionately magnifying the voltage of the alternating current delivered from the converter and an indicating instrument responsive to said magnified voltage.

2. A mechanism for measuring the thickness of plates wherein a direct current is applied through a pair of spaced points on the plate and the resultant potential between a second pair of points not colinear with the first pair and in definite spacial relation thereto is observed comprising a probe having a handle by which it may be grasped and wielded, pairs of individually spring-pressed electrodes definitely spaced in portions corresponding to the vertices of a quadrilateral carried thereby to be resiliently engaged with the plate when the probe is pushed against the same by means of the handle, conductors from said electrodes arranged as a flexible cable extending from the probe, and a container portable in the manner of a handbag in which are assembled devices for controlling current from a source of direct current to apply through two of the conductors a current of predetermined amperage to a pair of the electrodes, a convertor in circuit with the other pair of electrodes, an electronic amplifier for proportionately magnifying the voltage of the alternating current delivered from the converter, a rectifier for the current of magnified voltage, and an indicating instrument responsive to the output of the rectifier.

3. A mechanism for measuring the thickness of plates wherein a direct current is applied through a pair of spaced points on the plate and the resultant potential between a second pair of points not colinear with the first pair and in definite spacial relation thereto is observed comprising a probe having a handle by which it may be grasped and wielded, pairs of individually spring-pressed electrodes definitely spaced in portions corresponding to the vertices of a quadrilateral carried thereby to be resiliently engaged with the plate when the probe is pushed against the same by means of the handle, conductors from said electrodes arranged as a flexible cable extending from the probe, a plurality of containers individually portable in the manner of handbags having detachable electrical connectors for associating them and the conductors of said cable in a unitary electrical system, one of said containers having assembled therein devices for controlling current from a source of direct current to apply through two of the conductors a current of predetermined amperage to a pair of the electrodes, a converter in circuit with the other pair of electrodes, an electronic amplifier for proportionately magnifying the voltage of the alternating current delivered from the converter and an indicating instrument responsive to said magnified voltage, and a source of direct current housed in another container.

4. A mechanism for measuring the thickness of plates wherein a direct current is applied through a pair of spaced points on the plate and the resultant potential between a second pair of points not colinear with the first pair and in definite spacial relation thereto is observed comprising a probe having a handle by which it may be grasped and wielded, pairs of individually spring-pressed electrodes definitely spaced in portions corresponding to the vertices of a quadrilateral carried thereby to be resiliently engaged with the plate when the probe is pushed against the same by means of the handle, conductors from said electrodes arranged as a flexible cable extending from the probe, a plurality of containers individually portable in the manner of handbags having detachable electrical connectors for associating them and the conductors of said cable in a unitary electrical system, one of said containers having assembled therein devices for controlling current from a source of direct current to apply through two of the conductors a current of predetermined amperage to a pair of the electrodes, a converter in circuit with the other pair of electrodes, an electronic amplifier for proportionately magnifying the voltage of the alternating current delivered from the converter and an indicating instrument responsive to said magnified voltage, sources of direct current housed in another of the containers, and mechanism housed in a container other than the first for converting direct current into alternating current for operation of the electronic mechanisms in the first container.

5. A mechanism for measuring the thickness of plates wherein a direct current is applied through a pair of spaced points on the plate and the resultant potential between a second pair of points not colinear with the first pair and in definite spacial relation thereto is observed comprising a probe having a handle by which it may be grasped and wielded, pairs of individually spring-pressed electrodes definitely spaced in portions corresponding to the vertices of a quadrilateral carried thereby to be resiliently engaged with the plate when the probe is pushed against the same by means of the handle, conductors from said electrodes arranged as a flexible cable extending from the probe, a plurality of containers individually portable in the manner of handbags having detachable electrical connectors for associating them and the conductors of said cable in a unitary electrical system, one of said containers having assembled therein devices for controlling current from a source of direct current to apply through two of the conductors a current of predetermined amperage to a pair of the electrodes, a convertor in circuit with the other pair of electrodes, an electronic amplifier for proportionately magnifying the voltage of the alternating current delivered from the convertor, an indicating instrument responsive to said magnified voltage, sources of direct current housed in another of the containers, a mechanism housed in a container other than the first for converting direct current into alternating current for operation of the electronic mechanisms in the first container, an alternatively usable connection for connecting said electronic mechanisms to an alternating-current power line for operation by current drawn therefrom, and a rectifier in the container which houses the said electronic mechanisms operable by current supplied from said connection for recharging the sources of direct current.

6. A mechanism for measuring the thickness of plates wherein a direct current is applied through a pair of spaced points on the plate and the resultant potential between a second pair of points not colinear with the first pair is observed comprising a probe which includes a base for application to the work plate and a member slidably associated with said base for movement relatively thereto through a stroke of limited extent, said member carrying pairs of electrode points corresponding in relative position to vertices of a quadrilateral slidably associated therewith and normally spring projected, the probe comprising a handle operatively connected to the sliding member by means of which the base is brought into cooperation with the work for support therefrom and the member then slidably advanced to engage the electrode points with the work, a detachable connecting cable of substantial length including conductors from said electrode points whereby the probe may be freely moved to points of application relatively remote from the other end of the cable and a container manually portable in the manner of a handbag at said other end of the cable constituting a unitary controlling and recording station at which are assembled means for regulating direct current to supply a determined amperage thereof to one pair of electrodes, a device responsive to the resultant potential at the other pair, a voltage amplifier cooperating therewith and an indicating instrument responsive to the amplifier voltage.

7. A mechanism for measuring the thickness of plates wherein a direct current is applied through a pair of spaced points on the plate and the resultant potential between a second pair of points not colinear with the first pair is observed comprising a probe which includes a base for application to the work plate, a member slidably associated with said base for movement relatively thereto through a stroke of limited extent, said member having a downwardly opening socket with contacts therein, a detachable head in the socket having cooperating contacts and at its lower end pairs of electrode points corresponding in relative position to vertices of a quadrilateral slidably associated therewith and normally spring projected which are joined by flexible conductors to said second-mentioned contacts, the probe comprising a handle operatively connected to the sliding member by means of which the base is brought into cooperation with the work for support therefrom and the member then slidably advanced to bring the electrode points into engagement with the work, a detachable connecting cable of substantial length including conductors from said electrode points whereby the probe may be freely moved to points of application relatively remote from the other end of the cable and a container manually portable in the manner of a handbag at said other end of the cable constituting a unitary controlling and recording station at which are assembled means for regulating direct current to supply a determined amperage thereof to one pair of electrodes, a device responsive to the resultant potential at the other pair, a voltage amplifier cooperating therewith, and an indicating instrument responsive to the amplified voltage.

ROBERT C. SCOTT.

REFERENCES CITED

The following references are of record in the file of this patent:

UNITED STATES PATENTS

| Number | Name | Date |
| --- | --- | --- |
| 1,648,899 | Hayman | Nov. 15, 1927 |
| 1,895,643 | Putnam | Jan. 31, 1933 |
| 1,983,442 | Drake | Dec. 4, 1934 |
| 1,985,277 | Braddon | Dec. 25, 1934 |
| 2,094,234 | Drain | Sept. 28, 1937 |
| 2,204,396 | Barnes et al. | June 11, 1940 |
| 2,372,062 | Dorsman | Mar. 20, 1945 |
| 2,440,044 | Greenslade | Apr. 20, 1948 |